US010807038B2

(12) United States Patent
Li et al.

(10) Patent No.: US 10,807,038 B2
(45) Date of Patent: Oct. 20, 2020

(54) PROCESS FOR REMOVING S02 FROM GAS WITH S02 CONTENT THAT IS TEMPORARILY VERY HIGH

(71) Applicant: CANSOLV TECHNOLOGIES INC., Montreal, Quebec (CA)

(72) Inventors: Xijian Li, Beijing (CN); FengDan Wang, Beijing (CN)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 16/491,393

(22) PCT Filed: Mar. 6, 2018

(86) PCT No.: PCT/EP2018/055461
§ 371 (c)(1),
(2) Date: Sep. 5, 2019

(87) PCT Pub. No.: WO2018/162471
PCT Pub. Date: Sep. 13, 2018

(65) Prior Publication Data
US 2020/0016530 A1   Jan. 16, 2020

(30) Foreign Application Priority Data
Mar. 8, 2017  (WO) ................ PCT/CN2017/075974

(51) Int. Cl.
*B01D 53/50* (2006.01)
*B01D 53/14* (2006.01)
*B01D 53/18* (2006.01)
*B01D 53/75* (2006.01)
*B01D 53/78* (2006.01)
*C01B 17/60* (2006.01)

(52) U.S. Cl.
CPC ....... *B01D 53/504* (2013.01); *B01D 53/1425* (2013.01); *B01D 53/1481* (2013.01); *B01D 53/18* (2013.01); *B01D 53/502* (2013.01); *B01D 53/75* (2013.01); *B01D 53/78* (2013.01); *C01B 17/60* (2013.01); *B01D 2251/304* (2013.01); *B01D 2251/604* (2013.01); *B01D 2252/204* (2013.01)

(58) Field of Classification Search
CPC .............................. B01D 53/507; B01D 53/78; B01D 2257/302; B01D 2258/0283; B01D 53/1481; B01D 53/50; B01D 53/501; B01J 10/00; F23J 15/02; F23J 2215/20
See application file for complete search history.

(56) References Cited

U.S. PATENT DOCUMENTS

| | | | |
|---|---|---|---|
| 3,764,665 A | 10/1973 | Groenendaal et al. | |
| 4,170,628 A | 10/1979 | Kosseim et al. | |
| 4,389,383 A | 6/1983 | Sokolik, Jr. et al. | |
| 4,986,966 A * | 1/1991 | Lehto | B01D 47/12 261/121.1 |
| 4,990,315 A * | 2/1991 | Colley | B01D 53/501 422/170 |
| 5,019,361 A | 5/1991 | Hakka | |
| 5,753,012 A * | 5/1998 | Firnhaber | B01D 53/501 95/65 |
| 6,139,807 A | 10/2000 | Risse et al. | |
| 7,214,358 B2 | 5/2007 | Ravary et al. | |
| 2005/0100559 A1 | 5/2005 | Myatt et al. | |
| 2013/0039829 A1 | 2/2013 | Ouimet | |
| 2016/0243498 A1* | 8/2016 | Kamiyama | F23J 15/04 |
| 2017/0044015 A1 | 2/2017 | Rameshni et al. | |

FOREIGN PATENT DOCUMENTS

| | | |
|---|---|---|
| CA | 2691027 A1 | 6/2011 |
| CN | 105848757 A | 8/2016 |
| CN | 106039969 A | 10/2016 |
| DE | 3830390 C1 | 12/1989 |
| EP | 2537574 A1 | 12/2012 |

OTHER PUBLICATIONS

International Search Report and Written Opinion received for PCT Patent Application No. PCT/EP2018/055461, dated Aug. 21, 2018, 20 pages.
International Search Report and Written Opinion received for PCT Patent Application No. PCT/CN2017/075974, dated Dec. 8, 2017, 12 pages.
Fogg et al., "Solubility of Gases in Liquids: A Critical Evaluation of Gas/Liquid Systems in Theory and Practice", Chemie Ingenieur Technik, vol. 63, Issue No. 12, Dec. 1991, pp. 1-49.

* cited by examiner

*Primary Examiner* — Timothy C Vanoy

(57) ABSTRACT

The invention is directed to a process and a system for removing sulfur dioxide from a feed gas stream. In the process the feed gas pre-scrubbed. Then SO2 is absorbed from the gas with an absorbing medium. The spent absorbing medium is regenerated. These process steps are interchanged with a caustic treatment in the pre-scrubbing zone in case of a very high SO2 content in the feed gas stream. The system comprises a pre-scrubbing unit, an absorption unit, and a regeneration unit. The system is characterized in that the pre-scrubber unit comprises an inlet for an aqueous solution comprising a strong base. These are a simple, cost-efficient and reliable process and facility for processing gas with a varying SO2 content.

20 Claims, 2 Drawing Sheets

PROCESS FOR REMOVING SO2 FROM GAS WITH SO2 CONTENT THAT IS TEMPORARILY VERY HIGH

PRIORITY CLAIM

The present application is the National Stage (§ 371) of International Application No. PCT/EP2018/055461, filed Mar. 6, 2018, which claims priority from CN Application PCT/CN2017/075974, filed Mar. 8, 2017 incorporated herein by reference.

FIELD OF THE INVENTION

The present invention is directed to a process for removing sulfur dioxide (SO2) from a feed gas stream. The present invention is also directed to a system for removing sulfur dioxide from a feed gas stream. The process and the system are especially useful in case occasionally gas streams with a relatively high SO2 content need to be handled.

BACKGROUND TO THE INVENTION

SO2 is more soluble in water than many other components of feed gas streams. For example, measured at 1.013 bar 0° C., the solubility of SO2 in water is 228 g/L whereas the solubility of carbon dioxide and hydrogen sulfide in water is 3.369 g/L and 7.100 g/L, respectively.

The solubility of SO2 in many other pure solvents has also been widely studied. See, for example, Fogg and Gerrard, 1991 (Solubility of Gases in Liquids, John Wiley and Sons, Chichester, U.K.) for a summary of the literature solubility data of SO2.

Regenerable absorbents can be used to remove SO2 from feed gas streams. Typically, a lean aqueous medium comprising the absorbent is exposed to a SO2 containing feed gas stream, and then SO2 is absorbed by the medium forming a SO2 lean gas stream and a spent absorbing medium. Removal (recovery) of the absorbed SO2 from the spent absorbing medium to regenerate the aqueous medium and to provide gaseous SO2 is typically effected by gaseous stripping using steam generated in situ.

Amine-based absorbents can be used for SO2 removal. See, for example, U.S. Pat. No. 5,019,361 which discloses the use of an aqueous absorbing medium containing a water-soluble half salt of a diamine. U.S. Pat. No. 7,214,358 discloses the use of an aqueous absorbing medium containing a water-soluble half salt of a diamine and an elevated level of heat stable salts (HSS). Physical solvents can also be used as SO2 absorbents.

Commercially available steam-regenerable SO2 capture technologies include those that rely on chemical solvents or physical solvents, such as Cansolv DS™ (amine-based absorbent-containing chemical solvent), Labsorb™ (inorganic absorbent-containing chemical solvent), ClausMaster™ (non-aqueous physical solvent), and Sea water process (chemical solvent).

Use of a combination of solvents has also been disclosed. Indian Patent Application No. 2381/DEL/2006 describes a process for the removal of SO2 using a solvent blend comprising chemical and physical solvents. US20130039829 describes a process for the capture of sulfur dioxide from a gaseous stream utilizing a regenerable diamine absorbent comprising a diamine and a weak organic acid, such as formic acid.

In some processes SO2 is removed from a feed gas stream in an absorption zone, whereby SO2 lean gas leaves the absorption zone and rich absorbing medium is withdrawn and fed to a regeneration zone. The feed gas stream may, for example, be tail gas of a Sulfur Removal Unit (SRU), e.g. a Claus SRU. Regenerated absorbing medium may be recycled to the absorption zone. The SO2 comprising stream formed in the regeneration zone may be fed to the reaction furnace of a SRU, for example to the reaction furnace of a Claus SRU.

The SO2 content in the feed gas stream may temporarily be very high. Additionally or alternatively, it may temporarily not be possible to process the SO2 comprising stream formed in the regeneration zone in a unit, for example a SRU, upstream of the regeneration zone. One regularly used method in such cases is to send such streams, which have a relatively high SO2 concentration, to the stack. However, that results in a relatively high SO2 emission.

Another regularly used method in such cases is to feed such streams, which have a relatively high SO2 concentration, to a caustic wash system. Such a caustic wash system is normally not in operation. It may be in operation in the exceptional case that the SO2 content in the feed gas stream is very high. Additionally or alternatively, it may be in operation in the exceptional case that there is a temporary need to process the SO2 comprising stream formed in the regeneration zone in an alternative unit. The need to use such a caustic wash system often is limited to once in two to three years. This is disadvantageous as this caustic wash system has a very low usability while it is a complex, and often high cost, installation facility. Another disadvantage is that the caustic wash system often does not work properly anymore after a long standby time.

SUMMARY OF THE INVENTION

It is an aim to provide a relatively simple method for processing gas streams with a varying SO2 content, especially for temporarily processing gas streams having a very high SO2 content. It also is an aim to provide a cost-efficient method for processing gas streams with a varying SO2 content. And it is an aim to provide a method for processing gas streams which is suitable to treat gas streams with temporary peaks in SO2 content and which additionally is reliable even when rarely applied.

Further it is an aim to provide a relatively simple facility for processing gas streams with a varying SO2 content, especially for temporarily processing gas streams having a very high SO2 content. It also is an aim to provide a cost-efficient facility for processing gas streams with a varying SO2 content. And it is an aim to provide a facility for processing gas streams which is suitable to treat gas streams with temporary peaks in SO2 content and which additionally is reliable even after a long standby time.

In one aspect, the present invention is directed to a process for removing sulfur dioxide from a feed gas stream, which process comprises:
  (i) contacting the feed gas stream with an aqueous stream in a pre-scrubbing zone;
  (ii) contacting at least a part of the pre-scrubbed gas stream obtained in step (i) with an aqueous lean absorbing medium in an absorption zone to absorb sulfur dioxide and to form a sulfur dioxide lean treated gas stream and a spent absorbing medium;
  (iii) stripping, preferably steam stripping, absorbed sulfur dioxide from at least a part of the spent absorbing medium obtained in step (ii) in a regeneration zone to form a regenerated aqueous absorbing medium and gas stream comprising sulfur dioxide;

(iv) optionally recycling at least a portion of the regenerated aqueous absorbing medium obtained in step (iii) to step (ii);

(v) optionally feeding the gas stream comprising sulfur dioxide to a Sulfur Removal Unit, preferably to a Claus Sulfur Removal Unit;

whereby the series of steps (i) to (v) is interchanged with:

(A) contacting the feed gas stream with an aqueous solution comprising a strong base in the pre-scrubbing zone to form a sulfur dioxide lean treated gas stream and an aqueous solution comprising sulfite and/or bisulfite ions.

In another aspect, the present invention is directed to a system for removing sulfur dioxide from a feed gas stream, which system comprises:

a pre-scrubbing unit, preferably a pre-scrubbing tower, comprising a gas inlet, a gas outlet, a water inlet, and a water outlet, and a cooling unit;

an absorption unit comprising a gas inlet, a gas outlet, an inlet for absorbing medium, and an outlet for absorbing medium, which absorption unit is in fluid communication with the pre-scrubbing unit to receive at least part of a pre-scrubbed gas stream;

a regeneration unit comprising a gas inlet, a gas outlet, an inlet for absorbing medium, and an outlet for absorbing medium, which regeneration unit is in fluid communication with the absorption unit to receive at least part of a spent absorbing medium;

the system characterized in that the pre-scrubber unit comprises an inlet for an aqueous solution comprising a strong base.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF THE INVENTION

Figure 1:
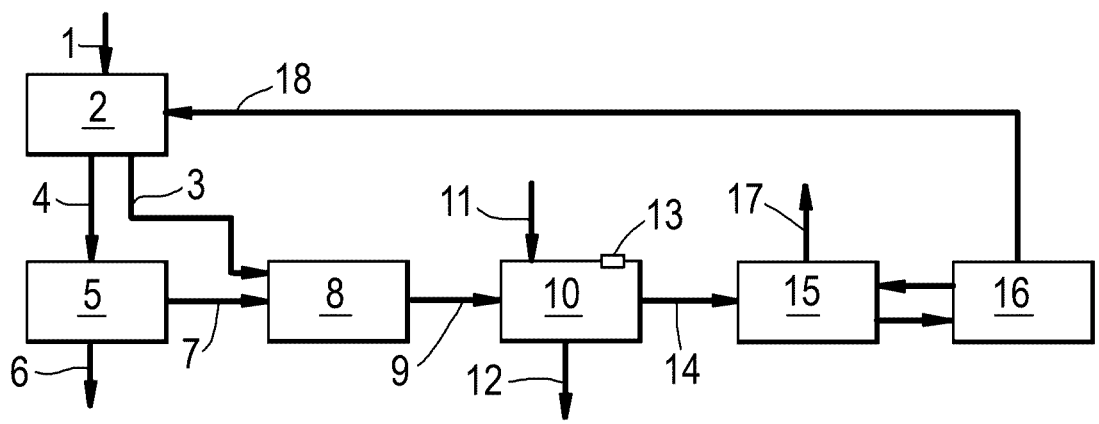
FIG. 1 is an illustration of a line-up comprising the system of the present invention. The line-up shown comprises the system of the invention and additionally a SRU, a degasser and an incinerator. The arrows indicate possible flows to and from the SRU, the degasser and the incinerator, and possible flows for process steps (i) to (v).

The invention is directed to a process and a system as described above in the section "summary of the invention" and as described in the claims. The process and the system of the invention are especially useful in case occasionally gas streams with a relatively high SO2 content need to be handled.

The claimed process is advantageous as it is a relatively simple method for processing gas streams with a varying SO2 content, especially for temporarily processing gas streams having a very high SO2 content. Additionally, it is a cost-efficient process. Furthermore, the process is suitable to treat gas streams with temporary peaks in SO2 content and additionally is reliable even when rarely applied.

The claimed system is advantageous as it is a relatively simple facility for processing gas with a varying SO2 content, especially for temporarily processing gas streams having a very high SO2 content. Additionally, it is a cost-efficient system. Furthermore, the system is suitable to treat gas streams with temporary peaks in SO2 content and additionally is reliable even after a long standby time.

Certain terms used herein are defined as follows. An aqueous stream is a stream comprising at least 20 vol % water, preferably at least 30 vol % water. An absorbing medium is capable of absorbing SO2. It preferably is capable of absorbing SO2 in the presence of water. An aqueous absorbing medium comprises an absorbing medium and at least 20 vol % water. Preferred aqueous absorbing mediums comprise a solution of absorbing medium in water. Examples of suitable absorbing mediums are amines.

A strong base is a base with a pKb of 5 or lower, preferably of 4 or lower, more preferably of 3 or lower. Preferred strong bases for the present invention are lithium hydroxide, sodium hydroxide, potassium hydroxide, rubidium hydroxide, cesium hydroxide, magnesium hydroxide, calcium hydroxide, strontium hydroxide and barium hydroxide.

Quenching is rapid cooling. This may be performed by direct or indirect cooling. One option to quench a hot or warm gas stream is to contact the hot or warm gas stream with water which has a much lower temperature.

In step (A) an aqueous solution comprising sulfite ($SO_3^{2-}$) and/or bisulfite ($HSO_3^-$) ions is formed. Bisulfite is also referred to as hydrogen sulfite. The aqueous solution formed in step (A) may comprise a sulfite salt and/or a hydrogen sulfite salt in solution. For example, it may comprise dissolved $Na_2SO_3$ and/or $NaHSO_3$.

The series of steps (i) to (v) is interchanged with step (A) or with steps (A) to (D). Steps (iv), (v) and (D) are optional. Hence, a process may comprise the series of steps (i) to (iii) which is interchanged with step (A) or with steps (A) to (C) or with steps (A) to (D). Similarly, a process may comprise the series of steps (i) to (iv), or steps (i) to (iii) and (v), or steps (i) to (v) which is interchanged with step (A) or with steps (A) to (C) or with steps (A) to (D).

A precipitator is a device that removes particles and/or liquid droplets from a gas stream. Preferably the gas stream, or a part thereof, flows through the precipitator. Precipitators are commercially available. Precipitators may comprise wires and/or plates. An electrostatic precipitator (ESP) may be used to remove particles and/or liquid droplets by means of an induced electrostatic charge. A wet electrostatic precipitator (WESP) may be used to remove particles and/or liquid droplets by means of an induced electrostatic charge, together with water vapor saturated gas streams, water sprays, irrigation and/or condensation.

The SO2 content in the feed gas stream may temporarily be very high. For example, the feed gas stream may be tail gas of a Sulfur Removal Unit (SRU), e.g. a Claus SRU. The feed gas stream is contacted with an aqueous stream, e.g. water, in a pre-scrubbing zone in step (i). Then SO2 is removed with an aqueous lean absorbing medium in an absorption zone in step (ii). When the SRU is shut down, it may be purged with a hot gas. The gas stream leaving the SRU may in that case have a very high SO2 content. If the gas stream leaving the SRU cannot be sufficiently processed in the absorption zone. In such cases the process and the system of the present invention are very useful. In a process according to the present invention the gas stream having a high SO2 content is contacted with an aqueous solution comprising a strong base in the pre-scrubbing zone in step (A). The resulting water stream, which may comprise a sulfite salt and/or a hydrogen sulfite salt, may be considered a waste stream. When the SO2 content in the feed gas stream may temporarily be very high the process and the system of the present invention thus are very useful.

Additionally or alternatively, it may temporarily not be possible or desired to process a SO2 comprising stream in a unit upstream of the regeneration zone. The SO2 comprising gas stream formed in the regeneration zone may be fed to the reaction furnace of a SRU, for example to the reaction furnace of a Claus SRU. When sent to the reaction furnace of a (Claus) SRU, it is possible to process the tail gas of this (Claus) SRU as feed stream in a process according to the invention. In other words, SO2 may be recycled to the (Claus) SRU which produces the feed stream which is treated in steps (i) and (ii) of a process according to the invention. When the (Claus) SRU is shut down, or for other reasons, it may temporarily not be possible or desired to process the SO2 comprising gas stream formed in the regeneration zone the reaction furnace of the (Claus) SRU. In a process according to the present invention the formation of such a SO2 comprising gas stream is avoided by contacting the SRU tail gas with an aqueous solution comprising a strong base in the pre-scrubbing zone in step (A). The resulting water stream, which may comprise a sulfite salt and/or a hydrogen sulfite salt, may be considered a waste stream. When it is temporarily not possible or desired to process a SO2 comprising stream in a unit upstream of the regeneration zone the process and the system of the present invention thus are very useful.

The feed gas stream from which SO2 is removed with the process of the invention may be any SO2 comprising gas stream. It may, for example be or comprise (thermally) oxidized tail gas from a Sulfur Removal Unit (SRU), for example a Claus SRU. Oxidized tail gas from a (Claus) SRU may be further treated, before or after oxidation, before it is used in a process according to the present invention.

Process for Removing Sulfur Dioxide from a Feed Gas Stream

In one aspect, the present invention is directed to a process for removing sulfur dioxide from a feed gas stream. The process comprises steps (i) to (iii) and optionally step (iv) and/or step (v). The series of steps (i) to (v) is interchanged with process step (A), or with steps (A) to (C) or with steps (A) to (D).

Step (i)

In step (i) the feed gas stream is contacted with an aqueous stream in a pre-scrubbing zone. The pre-scrubbing zone may, for example, be in a pre-scrubbing unit. Examples of suitable pre-scrubbing units are a tower or tube, a tower or tube with a wet electrostatic precipitator (WESP), and a tower or tube with a venturi and optionally a WESP. There may be a water recycle over the pre-scrubbing zone.

In case use is made of a tower or tube with a venturi, it is possible to quench the feed gas stream in the venturi during step (i). Additionally or alternatively, it is possible to quench the feed gas stream in the tower or tube during step (i).

Step (ii)

In step (ii) at least a part of the pre-scrubbed gas stream obtained in step (i) is contacted with an aqueous absorbing medium in an absorption zone. The aqueous absorbing medium is lean with regard to SO2. In step (ii) sulfur dioxide is absorbed and a sulfur dioxide lean treated gas stream and a spent absorbing medium are formed. The aqueous absorbing medium may comprise an amine. The aqueous absorbing medium comprises at least 20 vol % water, preferably at least 30 vol % water.

Step (iii)

In step (iii) absorbed sulfur dioxide is stripped, preferably steam stripped, from at least a part of the spent absorbing medium obtained in step (ii) in a regeneration zone. A regenerated aqueous absorbing medium and gas stream comprising sulfur dioxide are formed.

Optional Step (iv)

Step (iv) is optional. In step (iv) at least a portion of the regenerated aqueous absorbing medium obtained in step (iii) is recycled to step (ii).

Optional Step (v)

Step (v) is optional. In step (v) the gas stream comprising sulfur dioxide is fed to a Sulfur Removal Unit, preferably to a Claus Sulfur Removal Unit. It preferably is fed to the reaction furnace of a (Claus) SRU.

The series of steps (i) to (v) is interchanged with step (A).

Step (A)

In step (A) the feed gas stream is contacted with an aqueous solution comprising a strong base in the pre-scrubbing zone. A sulfur dioxide lean treated gas stream and an aqueous solution comprising sulfite and/or bisulfite ions are obtained. Preferably the strong base is chosen from lithium hydroxide, sodium hydroxide, potassium hydroxide, rubidium hydroxide, cesium hydroxide, magnesium hydroxide, calcium hydroxide, strontium hydroxide, and/or barium hydroxide, more preferably sodium hydroxide, potassium hydroxide, magnesium hydroxide, and/or calcium hydroxide, even more preferably sodium hydroxide.

Preferably the aqueous solution used in step (A) comprises 10 to 30 wt % NaOH, more preferably 15 to 25 wt % NaOH.

The strong base preferably is provided to the pre-scrubbing zone by feeding an aqueous solution comprising a strong base is fed to the pre-scrubbing zone. Preferably water is recycled over the pre-scrubbing zone. Preferably an aqueous solution comprising a strong base is added to such a water recycle over the pre-scrubbing zone before and/or during step (A).

The feed gas stream may be quenched before, during, or after step (A).

In one embodiment the feed gas stream is quenched when contacted with an aqueous solution comprising a strong base. In another embodiment the feed gas stream is quenched with relatively cold water, followed by contacting the feed gas stream with an aqueous solution comprising a strong base. In a further embodiment the feed gas stream is contacted with an aqueous solution comprising a strong base, followed by quenching with water. In another embodiment the feed gas stream is quenched with an aqueous solution comprising a strong base, followed by further quenching with an aqueous solution comprising a strong base.

Quenching and caustic treatment may be performed in a tower or tube.

In case use is made of a tower or tube with a venturi, it is possible to quench the feed gas stream in the venturi during step (A). Additionally or alternatively, it is possible to quench the feed gas stream in the tower or tube during step (A).

Quenching and caustic treatment may be performed at the same time in a venturi, and further quenching, and optionally further caustic treatment, may be performed in a tower or tube. In a preferred embodiment the feed gas stream is quenched with an aqueous solution comprising a strong base in a venturi, followed by further quenching with water in a tower or tube.

In a more preferred embodiment the feed gas stream is quenched with water in a venturi, followed by further quenching in a tower or tube by contacting the gas stream with an aqueous solution comprising a strong base.

In a highly preferred embodiment the feed gas stream is quenched with an aqueous solution comprising a strong base in a venturi, followed by further quenching in a tower or tube by contacting the gas stream with an aqueous solution comprising a strong base.

Step (A) may be followed by steps (B) to (D). In that case the series of steps (i) to (v) is interchanged with the series of steps (A) to (D).

Step (B)

In step (B) at least a part of the treated gas stream obtained in step (A) is contacted with an aqueous lean absorbing medium in an absorption zone, preferably the absorption zone used in step (ii). Sulfur dioxide is absorbed and sulfur dioxide lean treated gas stream and a spent absorbing medium are formed.

Step (C)

In step (C) absorbed sulfur dioxide is stripped, preferably steam stripped, from at least a part of the spent absorbing medium obtained in step (B) in a regeneration zone, preferably the regeneration zone used in step (iii). Regenerated aqueous absorbing medium and sulfur dioxide are formed.

Step (D)

Step (D) is optional. In step (D) at least a portion of the regenerated aqueous absorbing medium obtained in step (C) is recycled to step (ii) or to step (B).

System for Removing Sulfur Dioxide from a Feed Gas Stream

In another aspect, the present invention is directed to a system for removing sulfur dioxide from a feed gas stream. The system comprises a pre-scrubbing unit, an absorption unit, and a regeneration unit. The pre-scrubber unit of the system comprises an inlet for an aqueous solution comprising a strong base. This may also be referred to as an inlet for caustic.

Pre-Scrubbing Unit

The pre-scrubbing unit of the system preferably is a pre-scrubbing tower or tube. The pre-scrubbing unit comprises a gas inlet, a gas outlet, a water inlet, and a water outlet, and a cooling unit.

Preferably the system comprises a water recycle over the pre-scrubbing unit. More preferably the system comprises a water recycle with a cooling unit. Preferably the pre-scrubbing unit of the system comprises a precipitator, more preferably an electrostatic precipitator, even more preferably a wet electrostatic precipitator.

Absorption Unit

The absorption unit of the system comprises a gas inlet, a gas outlet, an inlet for absorbing medium, and an outlet for absorbing medium. The absorption unit is in fluid communication with the pre-scrubbing unit to receive at least part of a pre-scrubbed gas stream.

Regeneration Unit

The regeneration unit of the system comprises a gas inlet, a gas outlet, an inlet for absorbing medium, and an outlet for absorbing medium. The regeneration unit is in fluid communication with the absorption unit to receive at least part of a spent absorbing medium.

Inlet for Caustic

The pre-scrubber unit of the system comprises an inlet for an aqueous solution comprising a strong base. Preferably the water inlet of the pre-scrubbing unit is suitable to serve as inlet for an aqueous solution comprising a strong base.

The present disclosure is not limited to the embodiments as described above and the appended claims. Many modifications are conceivable and features of respective embodiments may be combined.

The following figures illustrating examples of certain aspects of some embodiments are given to facilitate a better understanding of the present invention. In no way should these figures be read to limit, or define, the scope of the invention.

Figures

FIG. 1 is an illustration of a line-up comprising the system of the present invention. The line-up shown comprises the system of the invention and additionally a SRU, a degasser and an incinerator. The arrows indicate possible flows to and from the SRU, the degasser and the incinerator, and possible flows for process steps (i) to (v).

In FIG. 1 a gas stream (1), which comprises hydrogen sulfide (H2S), is fed to a (Claus) SRU (2). (Claus) SRU tail gas (3), which comprises H2S, is fed to incinerator (8). A stream (4) comprising sulfur and H2S from the (Claus) SRU (2) is fed to a degasser (5). In the degasser (5) gas is separated from the solid sulfur. Solid elemental sulfur (6) is removed from the degasser (5). Off gas (7), which comprises H2S, is removed from the degasser (5). The off gas (7) is optionally fed to the incinerator (8). A gas stream (9), which comprises SO2, is removed from incinerator (8) and fed to pre-scrubber (10). Water (11) is fed to pre-scrubber (10). Pre-scrubber (10) has an inlet for caustic which is not used during steps (i) to (v). Effluent (12) is removed from pre-scrubber (10). Pre-scrubber (10) has an inlet (13) for a solution comprising a strong base. A gas stream (14), which comprises SO2, is removed from pre-scrubber (10) and fed to an absorber (15). In the absorber (15) the gas stream (14) is contacted with a lean absorbing medium. Rich absorbing medium is removed from absorber (15) and fed to regenerator (16). Regenerated absorbing medium is removed from regenerator (16) and fed to absorber (15). A gas stream (17) with a reduced amount of SO2 is removed from absorber (15). Gas stream (17) may be sent to the stack. A gas stream (18), which comprises SO2, is removed from regenerator (16) and optionally fed to the reaction furnace of (Claus) SRU (2).

Figure 2:
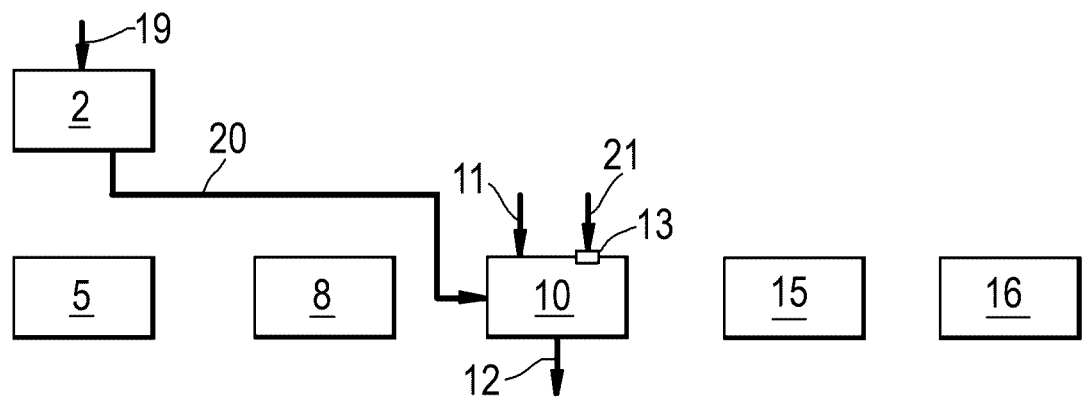
FIG. 2 is an illustration of the same line-up as shown in FIG. 1. The arrows indicate possible flows for process step (A).

FIG. 2 is an illustration of the same line-up as shown in FIG. 1. The arrows indicate possible flows for process step (A).

In FIG. 2 a gas stream (19), which is a hot purge gas, is fed to a (Claus) SRU (2) which has been shut down. The gas stream (20) leaving the SRU has a very high SO2 content. Gas stream (20) is fed to pre-scrubber (10). An aqueous solution comprising a strong base, preferably a solution of about 20 wt % NaOH in water, is fed to pre-scrubber (10) via inlet (13); this is stream (21). Effluent (12) is removed from pre-scrubber (10). Effluent (12) comprises a sulfite salt and/or a hydrogen sulfite salt, and is considered a waste stream. In the process illustrated in FIG. 2 the following units are not used during process step (A): degasser (5), incinerator (8), absorber (15) and regenerator (16).

Figure 3:
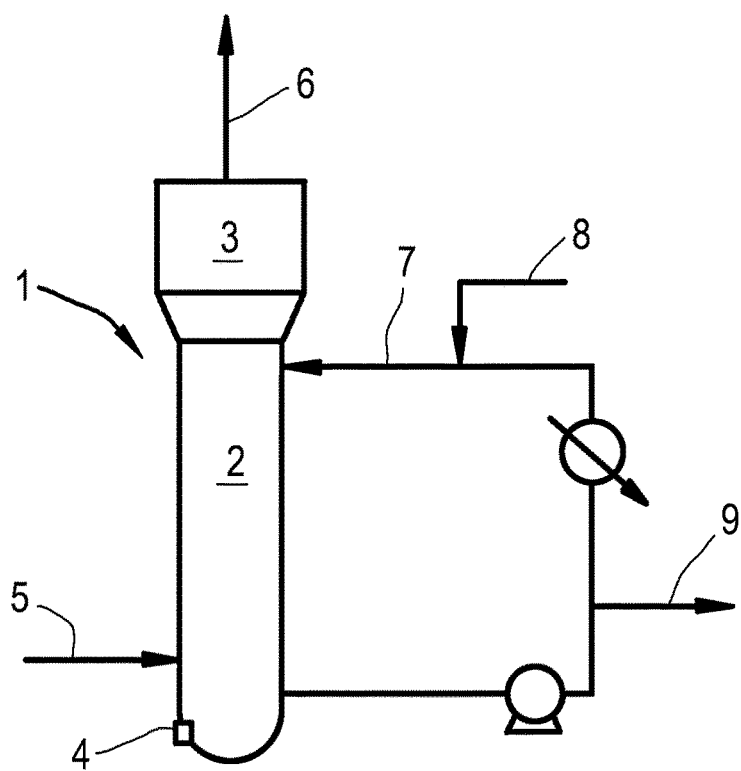
FIG. 3 is an illustration of a pre-scrubber with a water recycle and a wet electrostatic precipitator (WESP) that may be used in the present invention.

FIG. 3 is an illustration of a pre-scrubber with a water recycle and a wet electrostatic precipitator (WESP) that may be used in the present invention.

Pre-scrubber (1) comprises a tower or tube (2), a WESP (3), and an inlet for caustic (4). SO2 comprising gas (5) enters pre-scrubber (1). A gas stream (6), which comprises SO2, is removed from pre-scrubber (1). There is a water recycle (7) over pre-scrubber (1). Make up water (8) may be added, and effluent (9) may be treated as waste water. Effluent (9) is optionally fed to a waste water treatment unit (not shown).

Figure 4:
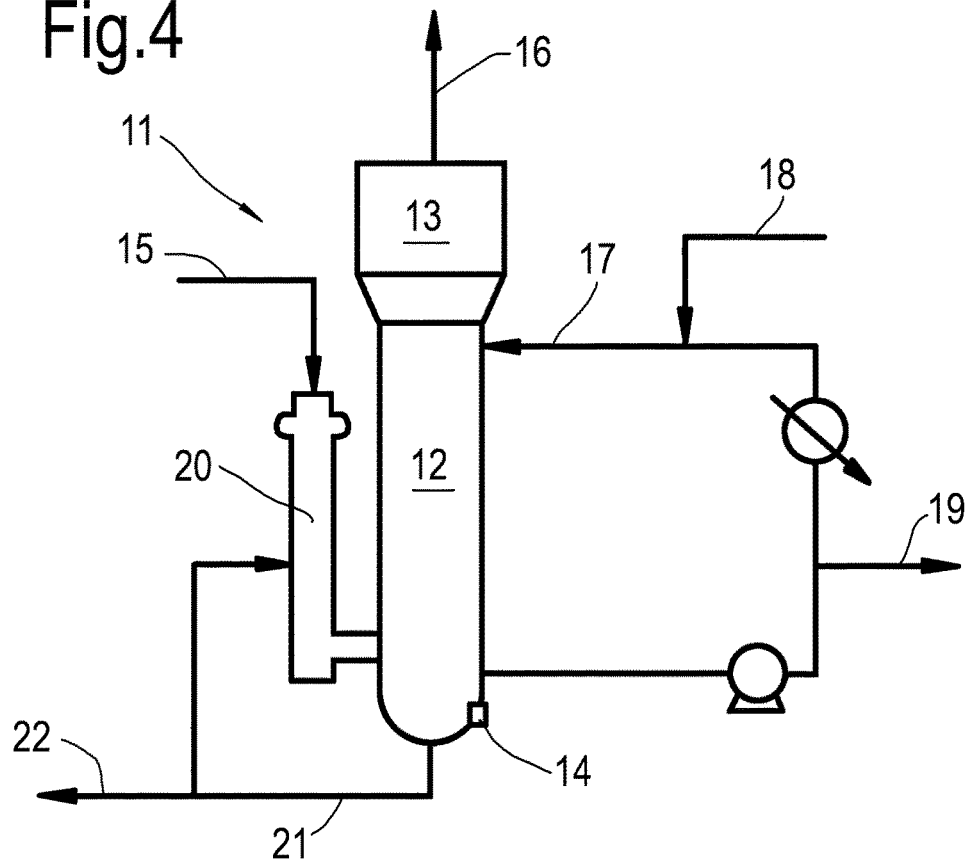
FIG. 4 is an illustration of a pre-scrubber with a venturi, a water recycle, and a WESP that may be used in the present invention.

FIG. 4 is an illustration of a pre-scrubber with a venturi, a water recycle, and a WESP that may be used in the present invention.

Pre-scrubber (11) comprises a tower or tube (12), a WESP (13), and an inlet for caustic (4). SO2 comprising gas (15) enters venturi (20). Quenched SO2 comprising gas enters tower or tube (12). A gas stream (16), which comprises SO2, is removed from pre-scrubber (11). There is a water recycle (17) over tower or tube (12). Make up water (18) may be added, and effluent (19) may be treated as waste water. Effluent (19) is optionally fed to a waste water treatment unit (not shown). There is a water recycle (21) from tower (12) to venturi (20). After addition of caustic at inlet (4) the water recycle (21) may comprise caustic. Effluent (22) may be treated as waste water. Effluent (22) is optionally fed to a waste water treatment unit (not shown).

That which is claimed is:

1. A process for removing sulfur dioxide from a feed gas stream, the process comprises:
    (i) contacting the feed gas stream with an aqueous stream in a pre-scrubbing zone to generate a pre-scrubbed gas stream;
    (ii) contacting at least a part of the pre-scrubbed gas stream obtained in step (i) with an aqueous lean absorbing medium in an absorption zone to absorb sulfur dioxide and to form a sulfur dioxide lean treated gas stream and a spent absorbing medium;
    (iii) stripping absorbed sulfur dioxide from at least a part of the spent absorbing medium obtained in step (ii) in a regeneration zone to form a regenerated aqueous absorbing medium and gas stream comprising sulfur dioxide;
    (iv) optionally recycling at least a portion of the regenerated aqueous absorbing medium obtained in step (iii) to step (ii);
    (v) optionally feeding the gas stream comprising sulfur dioxide to a Sulfur Removal Unit;
    whereby the series of steps (i) to (v) is interchanged with:
    (A) contacting the feed gas stream with an aqueous solution comprising a strong base in the pre-scrubbing zone to form a sulfur dioxide lean treated gas stream and an aqueous solution comprising sulfite and/or bisulfite ions.

2. The process according to claim 1, wherein step (A) is followed by:
    (B) contacting at least a part of the treated gas stream obtained in step (A) with an aqueous lean absorbing medium in the absorption zone to absorb sulfur dioxide and to form a sulfur dioxide lean treated gas stream and a spent absorbing medium;
    (C) stripping absorbed sulfur dioxide from at least a part of the spent absorbing medium obtained in step (B) in the regeneration zone to form a regenerated aqueous absorbing medium and sulfur dioxide;
    (D) optionally recycling at least a portion of the regenerated aqueous absorbing medium obtained in step (C) to step (ii) or to step (B);
and wherein the series of steps (i) to (v) is interchanged with the series of steps (A) to (D).

3. The process of claim 1, wherein during step (A) an aqueous solution comprising a strong base is fed to the pre-scrubbing zone.

4. The process according to claim 1, wherein water is recycled over the pre-scrubbing zone.

5. The process of claim 4, wherein before and/or during step (A) an aqueous solution comprising a strong base is added to the water recycle over the pre-scrubbing zone.

6. The process according to claim 1, wherein the strong base is chosen from lithium hydroxide, sodium hydroxide, potassium hydroxide, rubidium hydroxide, cesium hydroxide, magnesium hydroxide, calcium hydroxide, strontium hydroxide, and/or barium hydroxide, preferably sodium hydroxide, potassium hydroxide, magnesium hydroxide, and/or calcium hydroxide.

7. A system for removing sulfur dioxide from a feed gas stream, the system comprises:
    a pre-scrubbing unit comprising a gas inlet, a gas outlet, a water inlet, a water outlet, and a cooling unit;
    an absorption unit comprising a gas inlet, a gas outlet, an inlet for absorbing medium, and an outlet for absorbing medium, the absorption unit is in fluid communication with the pre-scrubbing unit and configured to receive at least part of a pre-scrubbed gas stream from the pre-scrubbing unit;
    a regeneration unit comprising a gas inlet, a gas outlet, an inlet for absorbing medium, and an outlet for absorbing medium, the regeneration unit is in fluid communication with the absorption unit and configured to receive at least part of a spent absorbing medium from the absorption unit;
    the system characterized in that the pre-scrubber unit comprises an inlet for an aqueous solution comprising a strong base.

8. The system of claim 7, wherein the water inlet of the pre-scrubbing unit serves as the inlet for an aqueous solution comprising a strong base.

9. The system of claim 7, wherein the system comprises a water recycle over the pre-scrubbing unit, and wherein the water recycle comprises a cooling unit.

10. The system of claim 7, wherein the pre-scrubbing unit comprises a precipitator.

11. The system of claim 10, wherein the precipitator is an electrostatic precipitator.

12. The system of claim 11, wherein the electrostatic precipitator is a wet electrostatic precipitator.

13. A process, comprising:
    scrubbing a gas stream in a pre-scrubber with an aqueous stream when the gas stream has a first concentration of sulfur dioxide to generate a pre-scrubbed stream and a first effluent, wherein the pre-scrubber is disposed downstream from and fluidly coupled to a sulfur removal unit (SRU) configured to generate the gas stream;
    scrubbing the gas stream in the pre-scrubber with a solution comprising a strong base when the gas stream has a second concentration of sulfur dioxide that is greater than the first concentration to generate the pre-scrubbed stream and a second effluent, wherein the second effluent comprises sulfite and/or bisulfite ions;
    removing sulfur dioxide from the pre-scrubbed gas stream in an absorber disposed downstream from and fluidly coupled to the pre-scrubber, wherein the absorber is configured to receive an aqueous lean absorbing medium that absorbs sulfur dioxide from the pre-scrubbed gas stream and to generate a sulfur dioxide lean gas stream and a spent absorbing medium; and
    regenerating the spent absorbing medium in a regeneration unit to generate a regenerated aqueous absorbing medium and a sulfur dioxide gas stream, wherein the regeneration unit is disposed downstream from and fluidly coupled to the absorber and the SRU.

14. The process of claim 13, comprising recycling at least a portion of the regenerated aqueous absorbing medium to the absorber.

15. The process of claim 13, comprising feeding the sulfur dioxide gas stream to the SRU.

16. The process of claim 13, comprising degassing the gas stream in a degasser disposed downstream from the SRU and upstream of the pre-scrubber when the gas stream has the first concentration of sulfur dioxide.

17. The process of claim 16, comprising bypassing the degasser and directly feeding the gas stream to the pre-scrubber when the gas stream has the second concentration of sulfur dioxide.

18. The process of claim 13, wherein the strong base has a pKa equal to or less than 5.

19. The process of claim 13, wherein the strong base is selected from lithium hydroxide, sodium hydroxide, potassium hydroxide, rubidium hydroxide, cesium hydroxide, magnesium hydroxide, calcium hydroxide, strontium hydroxide, and/or barium hydroxide, preferably sodium hydroxide, potassium hydroxide, magnesium hydroxide, and/or calcium hydroxide.

20. The process of claim 13, comprising quenching the gas stream in the pre-scrubber.

* * * * *